Patented Jan. 12, 1943

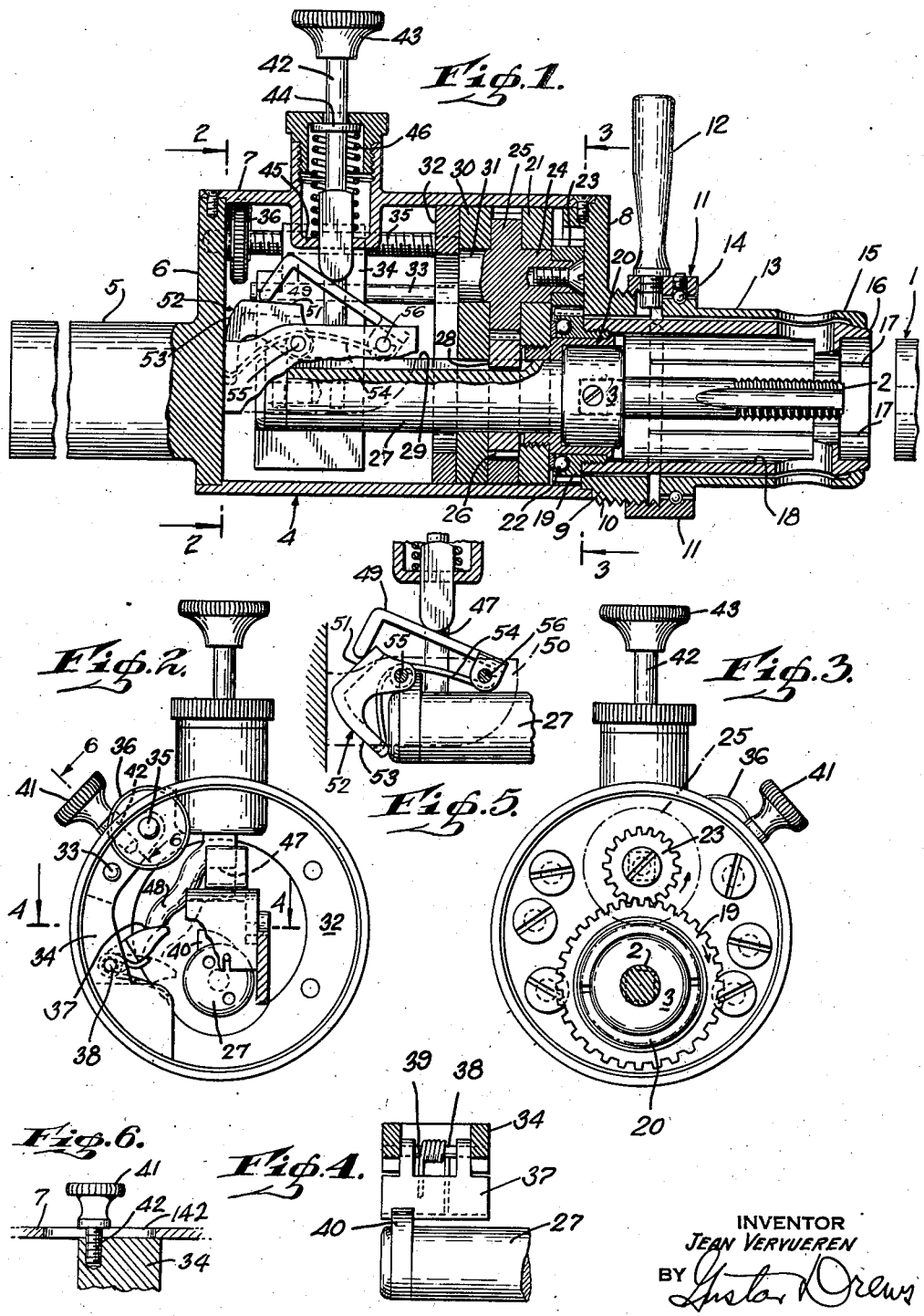

2,308,407

UNITED STATES PATENT OFFICE 2,308,407

MACHINE SHOP TOOL

Jean Vervueren, Hewlett, N. Y., assignor of one-half to Joseph E. Hagendorn, Hewlett, N. Y.

Application June 2, 1942, Serial No. 445,461

10 Claims. (Cl. 10—129)

This invention relates to machine shop tools in general and more especially to lathes for cutting screw threads and the like.

Among the objects of the present invention it is aimed to provide an improved machine shop tool whereby the machine can be set automatically to discontinue after a predetermined length of thread has been cut, and whereby then the machine can be expeditiously set to withdraw the tap from the work without causing the operation of the work or cutting tool to be reversed.

These and other features, capabilities and advantages of the invention will appear from the subjoined detailed description of one embodiment thereof illustrated in the accompanying drawing in which:

Figure 1 is a transverse section of the mechanism constituting the present invention.

Fig. 2 is a section on the line 2—2 of Fig. 1.

Fig. 3 is a section on the line 3—3 of Fig. 1.

Fig. 4 is a fragmental detail of part of the control mechanism shown in Fig. 1.

Fig. 5 is a section on the line 4—4 of Fig. 2.

Fig. 6 is a fragmental section on the line 6—6 of Fig. 2.

In the embodiment shown the fragmental portion 1 indicates the work to be operated upon by the tap 2 secured in the polygonal seat of the sleeve 3 in the usual way to rotate with the sleeve 3.

The work 1 is attached to the driven shaft of the lathe in the usual way and rotated thereby. The tap 2 and sleeve 3 in turn are carried by a fixture including the housing 4 which is mounted upon a pivoted arm in the usual way to be swung to and from the work 1 when bringing the cutting tool, the tap 2 in the present instance, either into cutting engagement with the work 1, or after the operation has been completed, away from the work 1 to replace the tap 2 or for other attention by the operator.

The housing 4 preferably has a handle 5 at one end thereof for engagement by the operator. The handle 5, in the present instance, is formed integral with the disk 6 forming the rear closure for the housing 4 being secured to the cylindrical wall 7 of the housing 4 by screws or the like as shown. The other end of the cylindrical wall 7 has secured thereto the disk 8 which has the cylindrical extension 9 eccentric to the cylindrical wall 7 and provided with external threads 10 to receive the control sleeve 11 having the handle 12 and connected to the extended sleeve 13 by the thrust bearing 14. The sleeve 13 has a slightly diminished gripping end 15 to engage the yieldable seat portion 16 for receiving the work 1. The seat portion 16 is made inwardly yieldable by the axially extending slits 17.

The seat portion 16 is formed at the end of the sleeve 18 disposed inside of the sleeve 13 and is screw threadedly connected or otherwise secured to the large gear 19 rotatably mounted upon the bearing 20 screw threadedly connected or otherwise secured to the partition 21. Between the gear 19 and the partition 21 there is interposed the thrust bearing 22. The large gear 19 meshes with the small gear 23 fixed on the hub 24 of the large gear 25, the hub 24 being journalled in the partition 21 with the small gear 23 on one side thereof and the large gear 25 on the other side thereof. The large gear 25 in turn meshes with the small gear 26 which is pinned to the shaft 27 by the key 28 slidably mounted in the keyway 28 in the shaft 27. The gears 25 and 26 are positioned between the partitions 21 and 30, the gear 25 having a second hub 31 journalled in the partition 30. The shaft 27 is not only journalled in the partition 30 but also in the partition 21 although slidable therein. The sleeve 3 has a greater diameter than that of the shaft 27 and cooperates with the bearing 20 as a stop to determine the innermost position of the cutting tool such as the tap 2.

The mechanism for initially presenting the tap 2 to the work 1 after the housing 4 has been positioned by the handle 5 and the mechanism for predetermining the length of the thread to be cut will now be described. Inside of the housing there is positioned a collar 32 adjacent to the partition 30. Slidably mounted on the pin 33 extending parallel to the axis of the housing 4 there is provided the bracket 34. One end of this bracket 34 is screw threadedly connected to the screw 35, the ends of which, however, are fixed axially but rotatably in the collar 32 at one end and the disk 6 at the other end. By turning the screw 35, the bracket 34 will be moved to and from the collar 32. To this end, there is provided the knurled wheel 36 fixed to rotate with the screw 35 and having a portion of its periphery extend to and through the cylindrical wall 7, see the projecting portion of the wheel 36 projecting through the cylindrical wall 7 in Figs. 2 and 3. In the bracket 34, there is provided the ledge 37, see Fig. 4, pivotally mounted on the pin 38 and provided with a spring 39 having one end engaging the ledge 37 and the other end engaging a portion of the bracket 34 normally to urge the ledge or shelf 37 upwardly. This shelf or ledge 37 is intended to intercept the spur 40 formed on the shaft 27. In other words, when the shelf 37 is depressed into the path of the spur 40 before the shaft 27 has been moved axially forward clear of the shelf 37, the shaft 27 will be anchored against rotation when the tap 2, due to the continued rotation of the work 1, will cut a thread into the work 1 a depth determined by the position of the ledge 37 controlled by the knurled control wheel 36. When the wheel 36 has once been set, then to anchor the same against accidental movement, and therewith against accidental displacement of the ledge 37, the set screw 41 is provided. This set screw 41 is screw threadedly connected to the bracket 34 and has a portion of its stem 42, see Fig. 2, slidably mounted in a slot 142 in the cylindrical wall 7 of the housing 4, so that when the set screw 41 is loosened, the bracket 34 can be readily positioned by the control wheel 36. After the wheel 36 has properly positioned the ledge 37, then the set screw 41 is tightened to anchor the bracket 34 against accidental displacement as aforesaid. The mechanism for initially advancing the tap 2 into engagement with the work 1 after the housing 4 has been positioned is controlled by the spring pressed plunger 42 having the head 43 and collar 44. Between the collar 44 and the abutment 45 there is tensed the spring 46 which normally maintains the plunger 42 in raised position as shown in Fig. 1.

The plunger 42, see Figs. 2 and 5, is provided with the shoulder 47 and the finger 48. The finger 48, see Fig. 2, is intended initially to depress the ledge 37 against the tension of the spring 39 until the shaft 27 due to initial engagement of the tap 2 with the work 1 has turned sufficiently to bring the spur 40 into engagement with the ledge 37 whereupon the plunger 42 may be released and the spur 40 will maintain the ledge 37 in depressed position while the ledge 37 in turn will anchor the shaft 27 against further rotation.

The shoulder 47 on the other hand is intended to engage the L-shaped bar 49 which is pivotally connected to the plate 50 extending inwardly from the disk 6. The bent end of the plate 50 normally rests on the portion 51 of the bracket 52 also pivotally connected to the plate 50 and the portion 53 disposed to engage the free end of the shaft 27. The bracket 52 is provided with the spring 54 fulcrumed on the pivot pin 55 of the bracket 52 and having one end engaging the pivot pin 56 of the bar 49 and the other end engaging the free end of the portion 51 to maintain the bracket 52 in raised position normally clear of the free end of the shaft 27.

With the mechanism so far described, the wheel 36 is initially set to determine the position of the ledge 37 and thereby the length of the screw thread to be cut, thereupon the set screw 41 is tightened, and then the fixture including the housing 4 advanced so that the work 1 engages the seat 16 and the end of the tap 2. If the fixture is held so that the tap 2 engages the work 1, the tap 2 will initially start to turn thereby turning the spur 40 on the shaft 27 with it. Now if the head 43 is engaged and the plunger 42 depressed so that the ledge 37 is depressed to intercept the spur 40, the moment the spur 40 strikes the ledge 37, the shaft 27 and tap 2 will come to rest, and the continued pressure of the tap 2 against the work 1 will cause the tap 2, then at rest while the work 1 is rotating, to start cutting a thread into the work 1.

Simultaneously with depressing the ledge 37, the depression of the plunger 42 will also deflect the bar 49 in turn to rock the bracket 52 whereupon the portion 53 will engage the free end of the shaft 27 to press the tap 2 into cutting engagement with the work 1.

As the work 1 rotates it will continue to draw the tap 2 into it and thereby cause the shaft 27 to move along the ledge 37 until the spur 40 clears it. The moment the spur 40 clears it, the shaft 27 and consequently the tap 2 will be free again to rotate with the work 1. Due, incidentally, to the fact that the train of gears 26, 25, 23 and 19 constitutes a speed reduction when the shaft 27 is rotated with the work 1 while the thimble or sleeve 18 is free to rotate relative to the work 1, the sleeve 18 will now rotate in the same direction with the work 1 but at a slower rate of speed.

By locking the sleeve 18 to rotate with the work 1, however, the train of gearing will serve as a speed accelerator and then the shaft 27 and in turn the tap 2 will rotate in the same direction with the work 1 but now at a faster speed and consequently rotate itself out of the work 1. To effect locking the sleeve 18 on the work 1 there are provided the slits 17 in the sleeve 18 and the sleeve 13 due to the position of the gripping end 15, when drawn inwardly, will clamp the seat 16 into locking engagement on the work 1. To draw the sleeve 13 inwardly, it is only necessary to engage the handle 12 and turn it to cause the collar 11 due to its screw threaded engagement with the extension 9 to draw the sleeve 13 toward the disk 8 and thereby cause the head 15 to engage the seat 16 and contract it into locking engagement with the work 1.

It is obvious that various changes or modifications may be made to the details of construction without departing from the general spirit of the invention as set forth in the appended claims.

I claim:

1. The combination with a thread cutting tool, of a tool holding fixture for a rotatable work carrying lathe or the like including a housing, a main shaft rotatably and slidably mounted in said housing, a tool receiving sleeve at the end of said shaft to receive said tool and secure it to rotate with said shaft, a work receiving sleeve for receiving the work normally at rest relative to the rotatable work during the thread cutting operation, locking means for anchoring the work to said work receiving sleeve at the completion of the thread cutting operation, and acceleration gearing operatively connecting said work receiving sleeve to said shaft whereby the rate of rotation speed imparted by the rotatable work to said work receiving sleeve will be transmitted to said shaft to cause the cutting tool to withdraw from the work by rotating at a faster speed than that of the work but in the same direction.

2. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a spur on said shaft, a plate pivotally mounted in said housing, a spring for normally maintaining the same out of the path of movement of said spur, a plunger for engaging said plate and depressing it into engagement with said spur whereby said shaft will be arrested to cause said arrested tool to cut into the work and advance axially thereby to advance said spur, and means for adjusting the position of said plate relative to the position of said spur to determine the length of the thread to be cut, said spur clearing said plate when the length of thread to be cut has been effected as determined by the position of said plate.

3. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work to enable the cutting tool to operate on said work while said work is rotating, a plate for engaging the rear end of said shaft to advance it and thereby said tool into cutting engagement with the work, said plate being pivotally mounted in said housing, a spring for normally maintaining said plate out of engagement with said shaft, and a manually operated plunger operatively associated to actuate said plate to advance said shaft and therewith said tool into cutting engagement with the work.

4. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work to enable the cutting tool to operate on said work while said work is rotating, a plate for engaging the rear end of said shaft to advance it and thereby said tool into cutting engagement with the work, said plate being pivotally mounted in said housing, a spring for normally maintaining said plate out of engagement with said shaft, a bent plate pivotally mounted in said housing and having its free end engaging said first plate and a manually operated plunger having an abutment for engaging said bent plate to actuate it and in turn to actuate said first plate to advance said shaft and therewith said tool into cutting engagement with the work.

5. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a spur on said shaft, a bracket, a screw threadedly connected to said bracket journalled in said housing, a control wheel fixed on said screw and partly projecting from said housing to permit manipulation thereof, a plate pivotally mounted on said bracket, a spring normally maintaining said plate out of the path of movement of said spur, and a plunger for engaging said plate and actuating it into the path of movement of said spur to arrest the rotation of said shaft in turn to cause said arrested tool to cut into the work and thereby advance said spur, the manipulation of said control wheel adjusting the position of said plate relative to the position of said spur to determine the length of thread to be cut, said spur clearing said plate when the length of thread to be cut has been effected as determined by the position of said plate.

6. The combination of a thread cutting tool, of a tool holding fixture for a rotatable work carrying lathe or the like including a housing, a main shaft rotatably and slidably mounted in said housing, a tool receiving sleeve at the end of said shaft to receive said tool and secure it to rotate with said shaft, a work receiving sleeve for receiving the work and normally at rest relative to the work, a device for anchoring said shaft against rotation with the work for a predetermined period to enable the cutting tool to operate on the work while the work is rotating and to liberate said shaft for rotation when said predetermined period has expired, locking means for anchoring the work to said work receiving sleeve when said device has liberated said shaft for rotation, and an acceleration gearing operatively connecting said work receiving sleeve with said shaft whereby the rate of rotation speed imparted by the rotatable work to said work receiving sleeve when fixed to rotate with the work will be transmitted to said shaft to cause the cutting tool to withdraw from the work by rotating at a faster speed than that of the work but in the same direction.

7. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work for a predetermined period to enable the cutting tool to operate on the work while the work is rotating, said work receiving sleeve being inwardly yieldable, a third sleeve surrounding said work receiving sleeve and operable to contract said work receiving sleeve into locking engagement with the work when said device has liberated said shaft for rotation, and an acceleration gearing operatively connecting said work receiving sleeve with said shaft whereby the rate of rotation speed imparted by the work to said work receiving sleeve when fixed to rotate with the work will be transmitted to said shaft to cause the cutting tool to withdraw from the work by rotating at a faster speed than that of the work but in the same direction.

8. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work for a predetermined period to enable the cutting tool to operate on the work while the work is rotating, said work receiving sleeve having axial slits to facilitate the inward yieldability, a third sleeve surrounding said work receiving sleeve, a fourth sleeve connected to said third sleeve and screw threadedly connected to said housing, and a handle for rotating said fourth sleeve in turn to cause said third sleeve to engage and contract said work receiving sleeve into locking engagement with the work when said device has liberated said shaft for rotation, and an acceleration gearing operatively connecting said work receiving sleeve with said shaft whereby the rate of rotation speed imparted by the work to said work receiving sleeve when fixed to rotate with the work will be transmitted to said shaft to cause the cutting tool to withdraw from the work by rotating at a faster speed than that of the work but in the same direction.

9. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work for a predetermined period to enable the cutting tool to operate on the work while the work is rotating, said work receiving sleeve being inwardly yieldable and having an outer tapered end, a third sleeve surrounding said work receiving sleeve and having a diminished inner periphery to engage said tapered end, a fourth sleeve connected to said third sleeve and screw threadedly connected to said housing, the rotation of said fourth sleeve in one direction causing said diminished inner periphery to engage said tapered end and contract said work receiving sleeve into locking engagement with the work when said device has liberated said shaft for rotation, and an acceleration gearing operatively connecting said work receiving sleeve with said shaft whereby the rate of rotation speed imparted by the work to said work receiving sleeve when fixed to rotate with the work will be transmitted to said shaft to cause the cutting tool to withdraw from the work by rotating at a faster speed than that of the work but in the same direction.

10. The combination with a thread cutting tool, of a tool holding fixture for a lathe or the like including a housing, a main shaft rotatably and slidably mounted in said housing, a tool receiving sleeve at the end of said shaft to receive said tool and secure it to rotate with said shaft, a work receiving sleeve for receiving the work and normally free to rotate relative to the work, a device for anchoring said shaft against rotation with the work for a predetermined period to enable the cutting tool to operate on the work while the work is rotating, said work receiving sleeve being inwardly yieldable and having an outer tapered end, a third sleeve surrounding said work receiving sleeve and having a diminished inner periphery to engage said tapered end, means for actuating said third sleeve to cause said diminished inner periphery to engage said tapered end and contract said work receiving sleeve into locking engagement with the work when said device has liberated said shaft for rotation, and an acceleration gearing operatively connecting said work receiving sleeve with said shaft whereby the rate of rotation speed imparted by the work to said work receiving sleeve when fixed to rotate with the work will be transmitted to said shaft to cause the cutting tool to withdraw from the work by rotating at a faster speed than that of the work but in the same direction.

JEAN VERVUEREN.